US009649797B1

(12) United States Patent
Williams et al.

(10) Patent No.: US 9,649,797 B1
(45) Date of Patent: May 16, 2017

(54) ELECTRICAL INSULATOR APPARATUS AND METHOD OF MANUFACTURING THE SAME

(71) Applicant: Marmon Utility, LLC, Milford, NH (US)

(72) Inventors: Michael L. Williams, Newburyport, MA (US); Gary C. Grenier, New Boston, NH (US); Charles J. Clement, Pelham, NH (US)

(73) Assignee: Marmon Utility, LLC, Milford, NH (US)

( * ) Notice: Subject to any disclaimer, the term of this patent is extended or adjusted under 35 U.S.C. 154(b) by 9 days.

(21) Appl. No.: 14/936,147

(22) Filed: Nov. 9, 2015

(51) Int. Cl.
*H01B 17/00* (2006.01)
*B29C 45/14* (2006.01)
*B29C 45/72* (2006.01)
*H01B 19/00* (2006.01)
*B29K 105/20* (2006.01)
*B29K 705/02* (2006.01)
*B29K 705/12* (2006.01)
*B29K 709/08* (2006.01)
*B29K 23/00* (2006.01)

(52) U.S. Cl.
CPC .... *B29C 45/14467* (2013.01); *B29C 45/7207* (2013.01); *H01B 19/00* (2013.01); *B29K 2023/065* (2013.01); *B29K 2023/0633* (2013.01); *B29K 2023/12* (2013.01); *B29K 2105/20* (2013.01); *B29K 2705/02* (2013.01); *B29K 2705/12* (2013.01); *B29K 2709/08* (2013.01)

(58) Field of Classification Search
CPC ...... H01B 19/00; H01B 17/00; H01B 17/005; H01B 17/26; B29C 45/14467; B29C 45/7207; B29K 2023/0633; B29K 2023/065; B29K 2023/12; B29K 2105/20; B29K 2705/02; B29K 2705/12; B29K 2709/08
USPC .............. 174/40 R, 650, 68.1, 137 R, 138 C, 174/110 PM, 142, 152 R, 174, 212; 16/2.1, 2.2
See application file for complete search history.

(56) References Cited

U.S. PATENT DOCUMENTS

| 6,441,310 B1 * | 8/2002 | Niedermier .......... H01B 17/325 174/174 |
| 7,180,003 B2 * | 2/2007 | Almgren ................ H01B 17/16 174/142 |
| 8,003,891 B2 * | 8/2011 | Rocks .................... H01B 17/28 174/137 R |

(Continued)

*Primary Examiner* — Angel R Estrada
(74) *Attorney, Agent, or Firm* — Hayes Soloway PC

(57) ABSTRACT

An electrical insulator apparatus and method of manufacturing an electrical insulator apparatus includes a core strength member which is positioned at least partially within at least one end-fitting. A thermoplastic exterior body having a plurality of spaced fins is injection-molded over the core strength member and at least partially over the at least one end-fitting. The core strength member is attached to the at least one end-fitting without a mechanical compression to the at least one end-fitting and without an adhesive between the core strength member and the at least one end-fitting. One or more mechanical upset structures formed on the at least one end-fitting prevent movements of the injection molded thermoplastic exterior body relative to the at least one end-fitting.

20 Claims, 9 Drawing Sheets

(56) References Cited

U.S. PATENT DOCUMENTS 8,324,504 B2  12/2012  Grenier

\* cited by examiner

200

> A core strength member is positioned at least partially within at least one end-fitting — 202

> A thermoplastic exterior body having a plurality of spaced fins is injection-molded over the core strength member and at least partially over the at least one end-fitting, whereby the core strength member is attached to the at least one end-fitting without a mechanical compression to the at least one end-fitting and without an adhesive between the core strength member and the at least one end-fitting — 204

FIG. 9

ELECTRICAL INSULATOR APPARATUS AND METHOD OF MANUFACTURING THE SAME

FIELD OF THE DISCLOSURE

The present disclosure is generally related to overhead distribution and transmission insulators and more particularly is related to an electrical post insulator apparatus and methods of manufacturing the same.

BACKGROUND OF THE DISCLOSURE

Insulators are used with electrical transmission and distribution systems to isolate and support electrical conductors above the ground for overhead power distribution and transmission. In power distribution systems, the most common insulator types are Pin-type and Post type insulators mounted on wood cross-arms to mechanically support the line conductors. These insulators are primarily designed for static loads but may be subject to dynamic loads, such as wind induced vibrating conductors or heavy objects falling on the line such as tree branches; therefore, they must withstand complex loads with compressive, cantilever, tensile and rotational force components. Pin-type insulators were developed in the nineteenth century and are still commonly applied to circuits today. As electrical networks and loads grew, with higher voltage systems and larger conductors, the Post type insulators were developed in the 1940's to better support these systems.

Traditional manufacturing of these Post type insulators is based on the wet-process porcelain process, also known as ceramics, by forming a body and cementing it to at least one ductile metal end-fitting. It is widely employed today to produce cost-effective insulators. Non-ceramic insulator manufacturing, also known as polymer or composite, was developed in the 1960's to overcome the high-weight and poor impact resistance characteristics of ceramics. The non-ceramic post insulators are comprised of metal end-fittings, a fiberglass core strength member and an outer weathershed, typically of elastomeric material. The fiberglass core provides mechanical strength sufficient to support high-voltage electrical conductors in both vertical and horizontal mounting configurations. Current manufacturing methods permanently attach the metal end-fittings to the core, most commonly by a mechanical compression method known as crimping or swaging.

FIG. 1 is an illustration of a fiberglass core 14 with metal end-fitting 12 used in a composite line post insulator 10, in accordance with the prior art. The metal end-fitting 12 of the composite line post insulator 10 may be crimped around the fiberglass core 14 with an eight-sided die compression machine, or a similar machine, which may result in imprints 16 within the metal end-fitting 12 where the die compression machine made contact. Other methods to secure the metal end-fittings to a fiberglass core may include an embedded substance, such as epoxy, and wedge or collet features to permanently fix the core in the end-fitting.

Non-ceramic insulators have grown in usage to be the preferred insulator for many post applications due to light weight, high strength, flexibility and resistance to impact; however, they have a high per unit cost when compared to conventional ceramic units. The current manufacturing methods require substantial machining, labor and equipment or materials to permanently attach the insulator components in the assembly process. The compression crimping method, though effective and preferred over other methods for cost advantages, is nonetheless costly, time-consuming and alters the surface of the fiberglass core.

The crimping process requires a machining operation to provide a precise known inside diameter on the end-fitting. This is performed by boring a precise known hole diameter to accept the fiberglass rod. After the machining operation, the flange portion left on the end-fitting about the hole has the desired wall thickness for the crimping operation. Another disadvantage of the crimping method is the creation of micro-fractures in the core material which can jeopardize the strength rating. Precision controlled crimping machines, equipped with acoustic monitors, can avoid excessive fracturing yet some amount is required to achieve a permanent attachment. Use of this method requires that the core member be sized to meet design load requirements after its outer layer is fractured. In other words, the core could be reduced in diameter if a non-compression attachment method was utilized.

Thus, a heretofore unaddressed need exists in the industry to address the aforementioned deficiencies and inadequacies.

SUMMARY OF THE DISCLOSURE

Embodiments of the present disclosure provide a system and method for an electrical insulator apparatus. Briefly described, in architecture, one embodiment of the system, among others, can be implemented as follows. A core strength member is positioned at least partially within at least one end-fitting. A thermoplastic exterior body has a plurality of spaced fins. The thermoplastic exterior body is injection molded over the core strength member and at least partially over the at least one end-fitting, wherein the core strength member is attached to the at least one end-fitting without a mechanical compression to the at least one end-fitting and without an adhesive between the core strength member and the at least one end-fitting.

The present disclosure can also be viewed as providing methods of manufacturing an electrical insulator apparatus. In this regard, one embodiment of such a method, among others, can be broadly summarized by the following steps: positioning a core strength member at least partially within at least one end-fitting; and injection-molding a thermoplastic exterior body having a plurality of spaced fins over the core strength member and at least partially over the at least one end-fitting, whereby the core strength member is attached to the at least one end-fitting without a mechanical compression to the at least one end-fitting and without an adhesive between the core strength member and the at least one end-fitting.

The present disclosure can also be viewed as providing an electrical insulator apparatus. Briefly described, in architecture, one embodiment of the apparatus, among others, can be implemented as follows. A fiberglass core strength member is positioned at least partially within a cavity of at least one metal end-fitting, wherein the at least one metal end-fitting further comprises at least one vertical mechanical upset structure and at least one rotational mechanical upset structure. An injection molded thermoplastic exterior body has a plurality of spaced fins. The injection molded thermoplastic exterior body is molded over the core strength member and at least partially over the at least one metal end-fitting, wherein the core strength member is attached to the at least one metal end-fitting without a mechanical compression to the at least one metal end-fitting and without an adhesive between the core strength member and the at least one metal end-fitting, and wherein the at least one vertical mechanical upset structure and the at least one rotational mechanical upset structure substantially inhibits a vertical and a rotational movement of the injection molded thermoplastic exterior body relative to the at least one metal end-fitting.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 9 is a flowchart illustrating a method of manufacturing an electrical insulator apparatus, in accordance with the first exemplary embodiment of the present disclosure.

DETAILED DESCRIPTION

Figure 1:
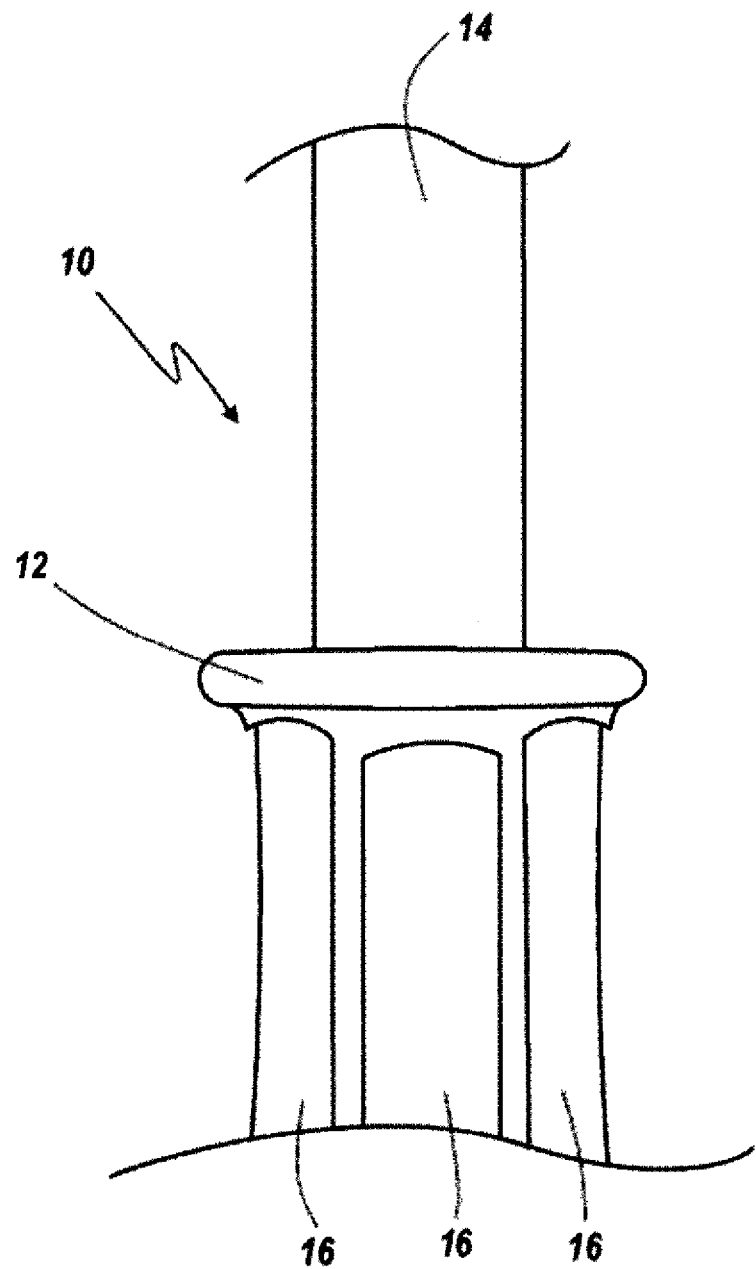
FIG. 1 is an illustration of a fiberglass core with metal end-fitting used in a composite line post insulator, in accordance with the prior art.
Figure 2:
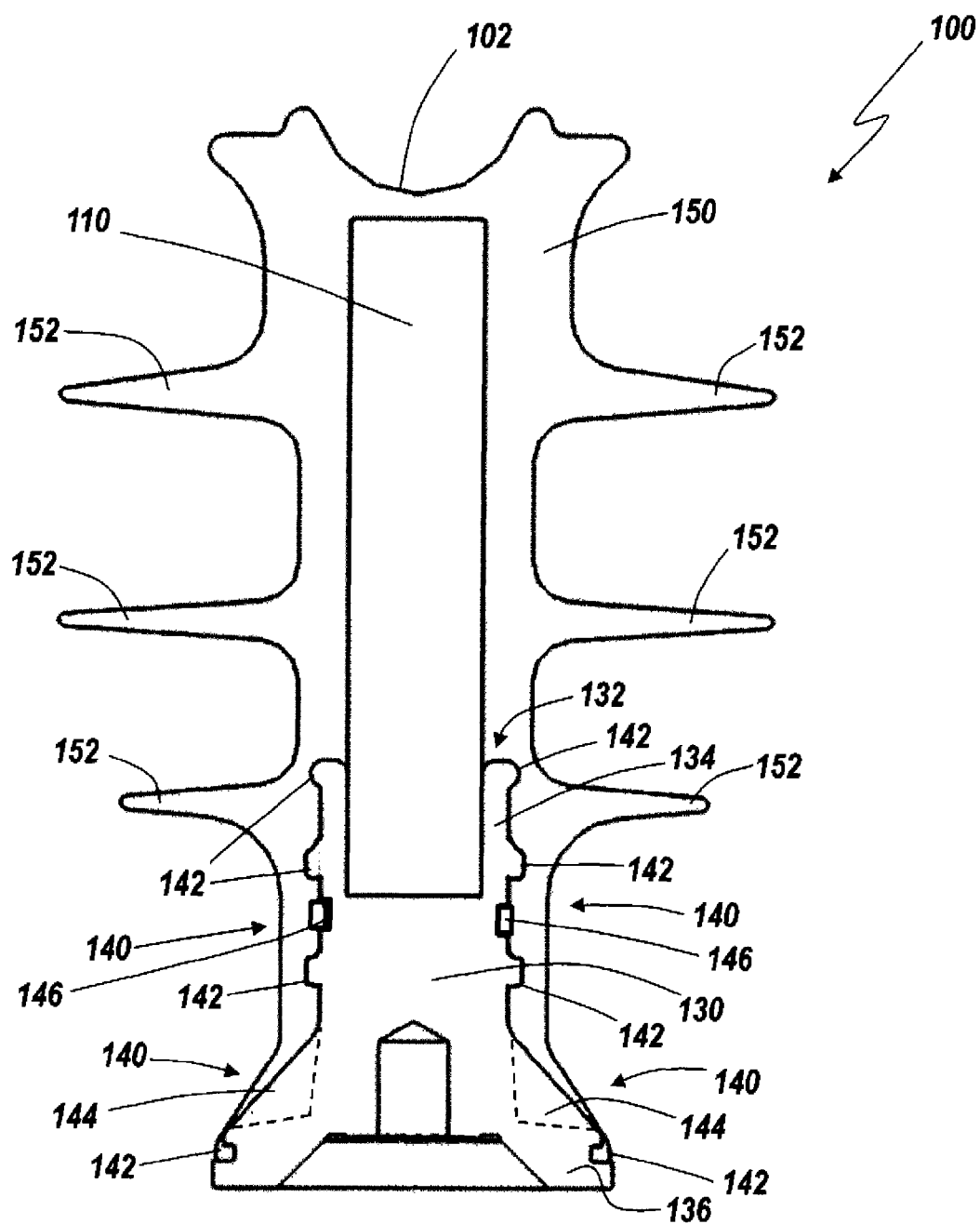
FIG. 2 is a cross-sectional illustration of an electrical insulator apparatus, in accordance with a first exemplary embodiment of the present disclosure.

FIG. 2 is a cross-sectional illustration of an electrical insulator apparatus 100, in accordance with a first exemplary embodiment of the present disclosure. The electrical insulator apparatus 100, which may be referred to herein simply as 'apparatus 100' has a core strength member 110 and at least one end-fitting 130. The core strength member 110 is positioned at least partially within the at least one end-fitting 130. A thermoplastic exterior body 150 has a plurality of spaced fins 152. The thermoplastic exterior body 150 is injection molded over the core strength member 110 and at least partially over the at least one end-fitting 130. The core strength member 110 is attached to the at least one end-fitting 130 without a mechanical compression to the at least one end-fitting 130 and without an adhesive between the core strength member 110 and the at least one end-fitting 130.

The electrical insulator apparatus 100 may be a replacement to conventional electrical insulators which use either a mechanical compression operation, such as a crimping process using a die compression machine, which mechanically compresses a conventional metal fitting around a conventional strength member to bind the conventional strength member to the conventional metal fitting. A mechanical compression operation requires significant setup time, equipment, and maintenance, and it often results in an undesired number of quality rejects. The electrical insulator apparatus 100 may also be a replacement to the conventional process of adhesively bonding a conventional strength member to a conventional metal fitting. Similar to the mechanical compression operation, an adhesive bonding process adds additional steps, equipment, and costs to manufacturing an electrical insulator.

The electrical insulator apparatus 100 is manufactured without a mechanical compression process and without an adhesive binding process, thereby reducing the manufacturing time, equipment, and costs as compared to those of a conventional post insulator. At a general level, the electrical insulator apparatus 100 utilizes standard dimensional tolerances for the core strength member 110 diameter and the cavity 132 of the end-fitting 130 in combination with an over-molded exterior body 150 to retain the core strength member 110 to the end-fitting 130. To aid in meeting the structural requirements of electrical insulators, mechanical upset structures 140, such as bosses, grooves, and holes, for example, are formed on the end-fitting 130. The thermoplastic material from which the exterior body 150 is formed allows the exterior body to compressively shrink over the core strength member 110 and end-fitting 130.

The core strength member 110 may include a fiberglass rod having a length that is determined by a desired length of the apparatus 100. The core strength member 110 may provide a mechanical strength to the apparatus 100, thereby allowing it to successfully retain a distribution and transmission conductor in an elevated position. The apparatus 100 may include one or more end-fittings 130 which are constructed from metal. Preferably, the end-fitting 130 is constructed from a ductile metal, for example cast or forged steel or die cast aluminum-silicon alloy, and the end-fitting may have a variety of shapes and sizes. The end-fitting 130 commonly includes a base portion 136 with a neck 134 extending from the base portion 136. An internal blind cavity 132 may be formed within the neck 134 and about a central axis of the end-fitting 130. The cavity 132 may be sized to receive an end of the core strength member 110 with a predetermined tolerance. The tolerance may be less restrictive than conventional electrical insulators. For example, the dimensional tolerances of the internal diameter of the cavity 132 in the end-fitting 130 and the external diameter of the core strength member 110 may be, for example, +/−0.010", which is standard to the metal working and the fiber-rod pultrusion industries, respectively. In contrast, the crimping process used with conventional electrical insulators requires tighter tolerances, for example, +/−0.003", which must always be consistent and well controlled in order to have a successful crimping operation and reduce manufacturing rejects.

The exterior body 150 is formed over the core strength member 110 and end-fitting 130, preferably, by injection molding a thermoplastic material over the core strength member 110 and end-fitting 130. As depicted in FIG. 2, the over-molding of the exterior body 150 on the end-fitting 130 may leave an underside of a base 136 of the end-fitting 130 uncovered. The material(s) used in the exterior body 150 are preferably thermoplastic olefin polymers such as High Density Polyethylene (HDPE), Linear Low Density Polyethylene, Polypropylene, and any blends of these polymers. The thickness of the exterior body 150 does not necessarily have to be uniform over the core strength member 110 and end-fitting 130, but it is preferable that the thickness is at least ¼ inch to ½ inch thick.

The injection molding process is designed to utilize the material properties of the thermoplastic compounds from which the exterior body 150 is formed. After molding, the exterior body 150 cools down and shrinks around the over molded core strength member 110 and end-fitting 130. This shrinkage may capture a suitably dimensioned core and at least one end-fitting as the material changes from the molten injection state to the normal temperature solid state, and as a result, a permanent radial compression may be maintained on substantially all portions of the core strength member 110 and end-fitting 130. The intrinsic mechanical strength, the elongation range, and the resistance to tear make the olefin polymers an ideal candidate for the exterior body 150 material. In contrast, if softer polymers were used, such as rubber, silicone and plastisol, etc., the exterior body 150 may be prone to easily stretching and the assembly may come apart under relatively low mechanical loads. With more brittle plastics such as cycloaliphatic epoxies, the exterior body 150 may be prone to failing dramatically by cracking, breaking, and/or shattering under the load conditions. Accordingly, the thermoplastic olefin polymers used in the exterior body 150 provide the desired elasticity under the different dynamic modes of loads, recover and maintain the assembly together.

The apparatus 100 may include at least one mechanical upset structure 140 which acts as a mechanical feature to inhibit or prevent movement of the exterior body 150 relative to the core strength member 110 and end-fitting 130. The at least one mechanical upset structure 140 may include a variety of different upset features, such as at least one vertical mechanical upset structure, which inhibits movement of the exterior body 150 along a length of the core strength member 110, and at least one rotational mechanical upset structure, which inhibits a rotational movement of the exterior body 150 about the core strength member 110. Other mechanical upset structures 140 may include blind holes or through-holes formed within the end-fitting 130. The various mechanical upset structures 140 may include a number of different structures which may be formed on a variety of different places on the end-fitting 130. For example, a vertical mechanical upset structure 142 may include a horizontal boss, groove, or similar structure which is positioned about the neck 134 of the end-fitting 130. The horizontal mechanical upset structure 144 may include a vertical boss, web, or similar structure which is positioned between the base 136 and the neck 134 of the end-fitting 130. The mechanical upset structures 140 may also include a single structure which acts as both a vertical and horizontal mechanical upset structure and may be of circular, oval, or rectangular shape. For example, a blind hole 146 or through-hole 148 (FIG. 5B) within the neck 134 of the end-fitting 130 can prevent movement of the exterior body 150 in both vertical and rotational directions.

It is noted that FIG. 2 depicts vertical and horizontal mechanical upset structures 142, 144 as bosses and also depicts blind holes 146, but it is preferable to utilize only those structures which are necessary for a given design, e.g., vertical and horizontal bosses and/or grooves together, or a variety of blind or through-holes together. The use of duplicative mechanical upset structures 140, such as horizontal bosses, vertical bosses, and blind holes or through-holes together may be unnecessary. As discussed further relative to FIGS. 3-5B, the specific movement inhibiting structure 140 or combination thereof that is used may be dependent on the design of the apparatus 100.

The apparatus 100 has been tested to meet the tensile, torsion and cantilever loads specified by the American National Standard Institute (ANSI) without the need of a crimping operation or of an adhesion operation which affixes together the core strength member 110 and end-fitting 130. To meet a given cantilever level, the length and diameter of the core strength member 110, and the length of engagement between the cavity 132 of the end-fitting 130 and the core strength member 110 may be appropriately selected. Within the industry, meeting a specified cantilever level is a well-known practice which can also be adopted with the apparatus 100. The polymeric exterior body 150 may not be a major contributor in meeting the cantilever load requirement of the apparatus 100. Rather, the core strength member 110 may be inserted in the cavity 132 of the end-fitting 130 to sufficiently meet or exceed the 2400 lbs. minimum flexural load required by ANSI for distribution line post type insulators. In a particular case where one end-fitting 130 is used at the base of the apparatus 100 and the top end 102 of the apparatus 100 receiving the conductor is a non-metallic head formed by the thermoplastic material of the exterior body 150 itself (e.g., FIGS. 2 and 6), the thickness of the thermoplastic material of the exterior body 150 surrounding the top edge of the core strength member 110 may preferably be at least ⅜ inch to avoid bulging or tearing of the thermoplastic material in excessive head deflections and cantilever loads conditions.

Figure 3:
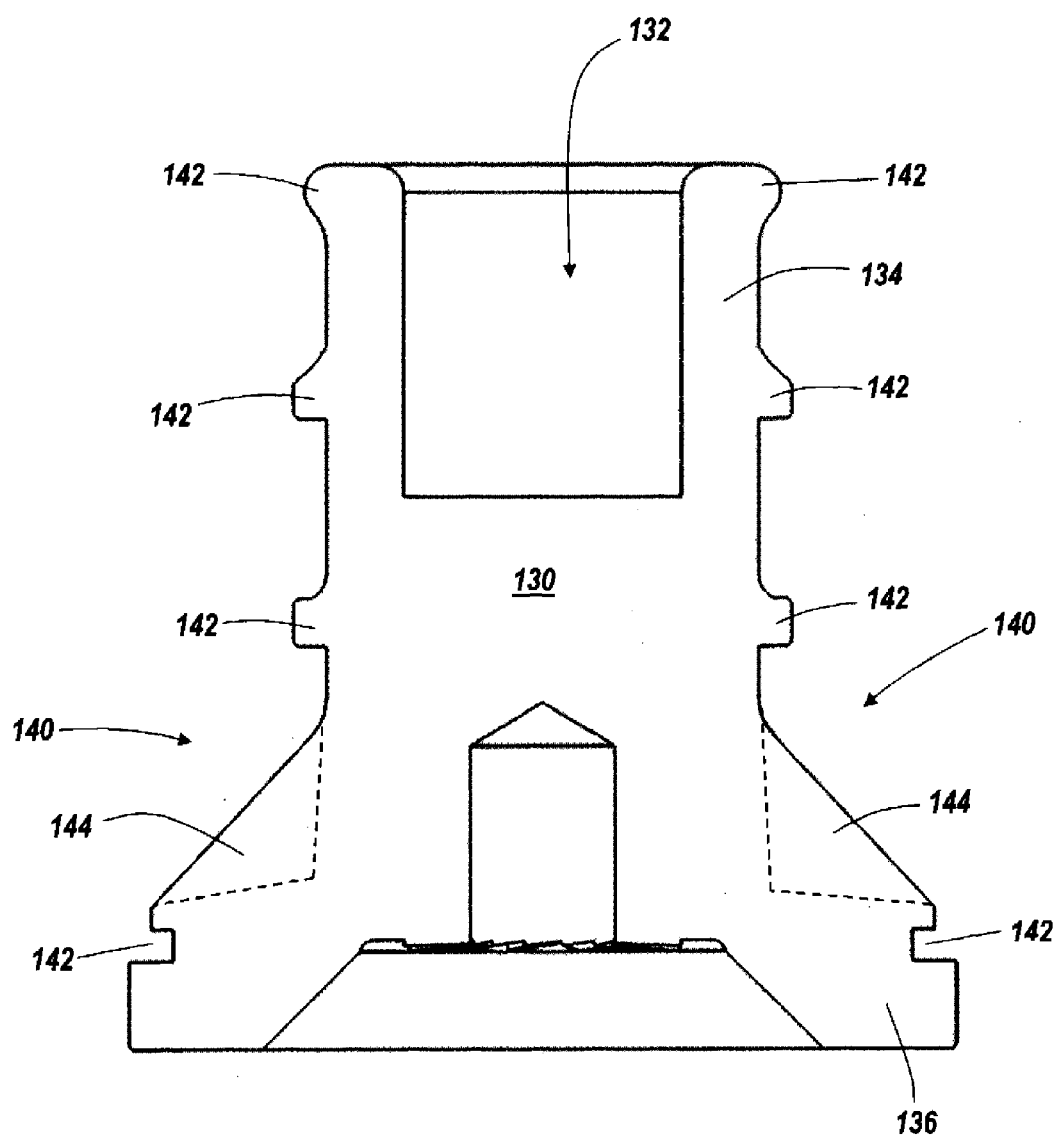
FIG. 3 is a cross-sectional illustration of an end-fitting of the electrical insulator apparatus, in accordance with the first exemplary embodiment of the present disclosure.
Figure 4:
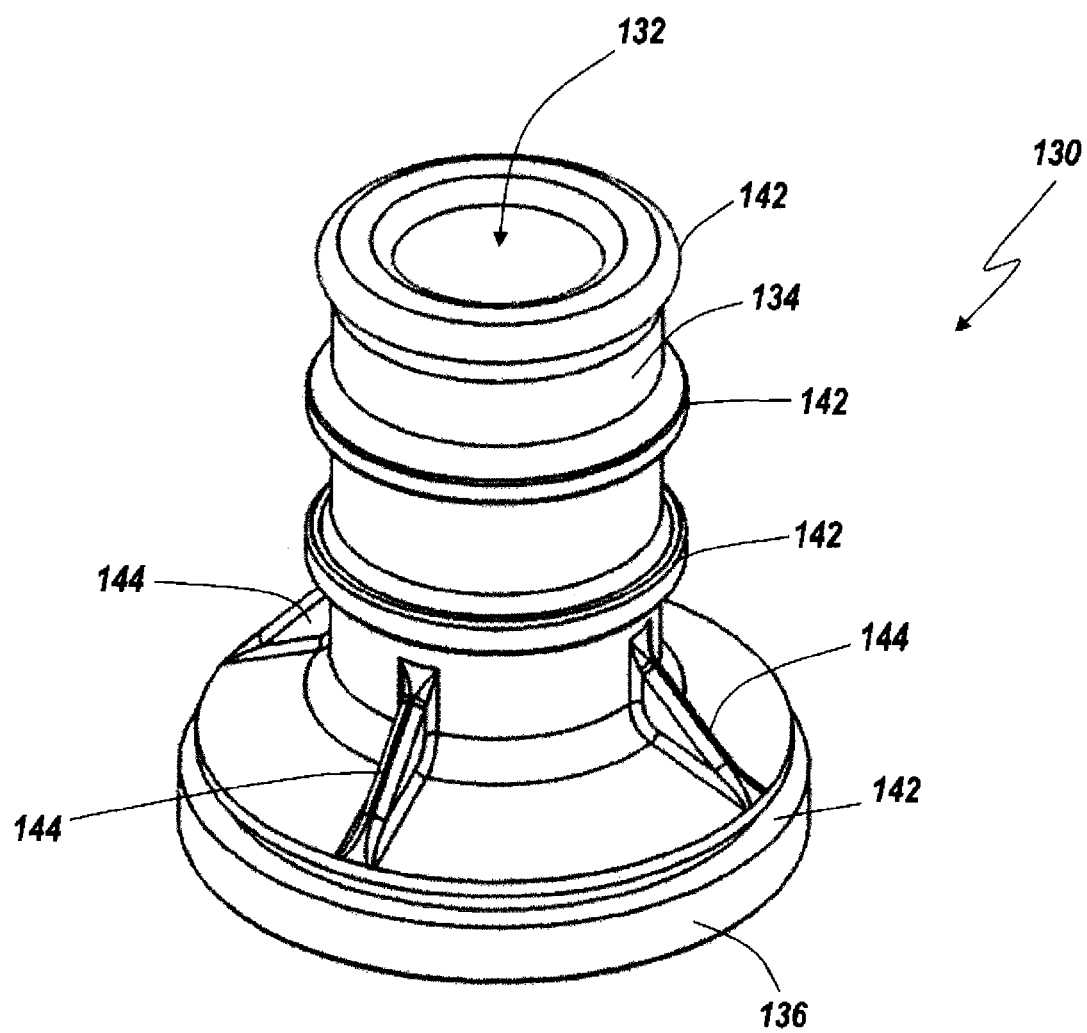
FIG. 4 is a plan view illustration of the end-fitting of the electrical insulator apparatus, in accordance with the first exemplary embodiment of the present disclosure.

FIG. 3 is a cross-sectional illustration of an end-fitting 130 of the electrical insulator apparatus 100, in accordance with the first exemplary embodiment of the present disclosure. FIG. 4 is a plan view illustration of the end-fitting 130 of the electrical insulator apparatus 100, in accordance with the first exemplary embodiment of the present disclosure. Specifically, FIGS. 3-4 depict mechanical upset structures 140 in detail, including a plurality of horizontal mechanical upset structures 142 and vertical mechanical upset structures 144 formed on an exterior surface of the end-fitting 130.

The end-fitting 130 may require horizontal mechanical upset structures 142 when the general shape of the end-fitting 130 is cylindrical, in order to anchor the thermoplastic polymer molded exterior body (FIG. 2). While the present disclosure depicts the exemplary use of bosses, grooves, and holes as horizontal mechanical upset structures 142, it is noted that other horizontal mechanical upset features may also be used, all of which are considered within the scope of the present disclosure. When bosses or grooves are utilized as horizontal mechanical upset structures 142, they may be designed to have a generally square profile increasing the anchorage and the resistance to slippage of the exterior body in tensional conditions, e.g., when the exterior body is moved vertically relative to the end-fitting 130. The depths and widths of the bosses or grooves preferably range from between ⅛ inch and ⅜ inch in order to accomplish a tensile load requirement, for example from 1,500 lbs. to 5,000 lbs. Regardless of the tensile load levels sought, preferably at least three horizontal mechanical upset structures 142 may be used in the end-fitting 130, although the specific number of horizontal mechanical upset structures 142 may vary by design. In FIGS. 3-4, for example, the horizontal mechanical upset structures 142 may be formed about the neck 134 of the end-fitting at the rim of the cavity 132 and may be positioned at various intervals along the neck 134. The choice of which type of mechanical upset feature to use, such as between a groove and a boss, may be dictated by the location of the mechanical upset feature in the end-fitting 130, the geometry of the end-fitting 130, and the design constraints of the end-fitting 130.

The end-fitting 130 may require vertical mechanical upset structures 144 to prevent rotational movements between all components, including the core strength member (FIG. 2), the one or more end-fittings 130, and the exterior body (FIG. 2) of the apparatus 100 when subjected to torque loads. While the present disclosure depicts the exemplary use of bosses, grooves, and holes as vertical mechanical upset structures 144, it is noted that other vertical mechanical upset features may also be used, all of which are considered within the scope of the present disclosure. The vertical mechanical upset structures 144 may be positioned connected between the base 136 and neck 134 of the end-fittings 130 or on the neck 134 alone. In one example, the end-fitting 130 may preferably have at least four equally spaced vertical mechanical upset structures 144, which preferably have a generally square/rectangular cross section to better resist slippage of the exterior body (FIG. 2) under torsional conditions. The overall length of the vertical mechanical upset structures 144 could be minimized by increasing its depth. Therefore, the depth and width of the vertical mechanical upset structures 144 are preferably at least 3/16 inch up to 3/8 inch, which test has shown to prevent the exterior body (FIG. 2) and the other components from slipping when tightening the apparatus 100 during installation and under any normal torsional field conditions.

Figure 5A:
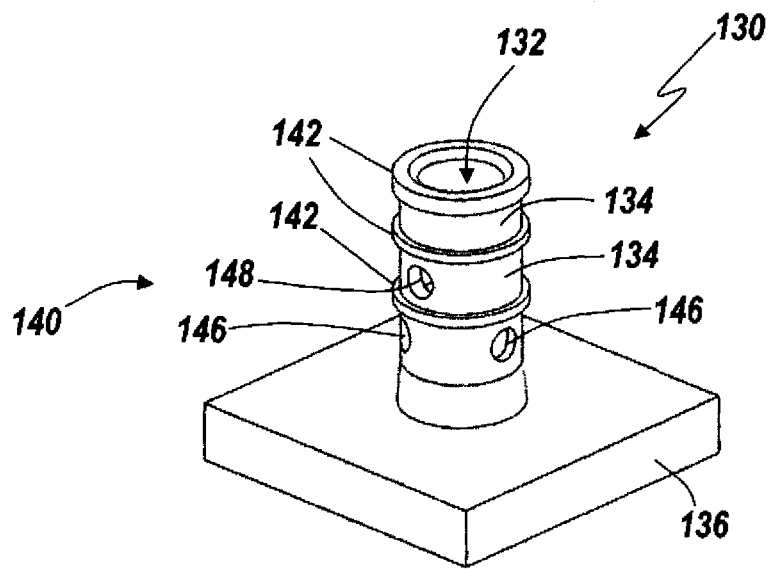
FIGS. 5A-5B are plan view and side view illustrations of an end-fitting of the electrical insulator apparatus, in accordance with the first exemplary embodiment of the present disclosure.
Figure 5B:
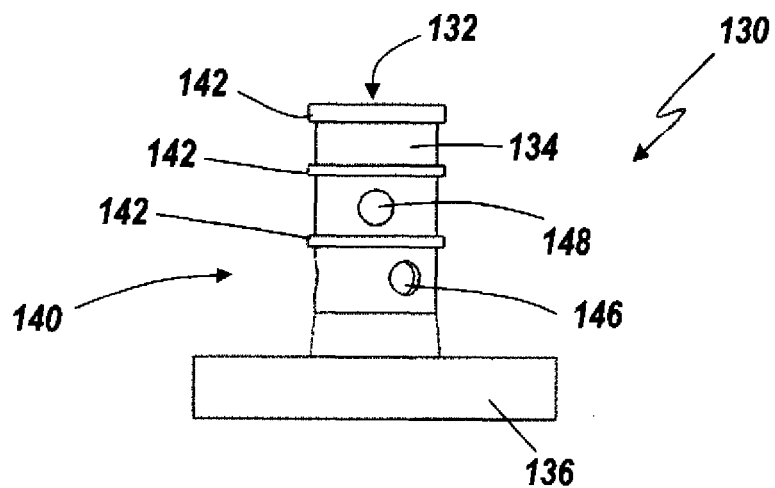

FIGS. 5A-5B are plan view and side view illustrations of an end-fitting 130 of the electrical insulator apparatus 100, in accordance with the first exemplary embodiment of the present disclosure. Specifically, FIGS. 5A-5B depict the use of holes as mechanical upset structures 140, including through-holes 148 as shown in FIG. 5A and blind hole 146 as shown in FIG. 5B. The blind holes 146 and/or through-holes 148 may be used in place of or in addition to other vertical and horizontal mechanical upsets. FIGS. 5A-5B depict the blind holes 146 and through-holes 148 being used in combination with horizontal mechanical upset structures 142 formed as bosses. The blind holes 146 and/or through-holes 148 may serve a dual purpose for tensile and torsional slipping resistance between the components of the apparatus 100. Using holes as mechanical upsets may be desired when the geometry and the wall thickness of the end-fitting 130 allow it and when the integrity of the end-fitting 130 would not be compromised due to the presence of the holes. The through-hole 148 in FIG. 5A may have a diameter of preferably 1/4 inch up to 1/2 inch and be formed through the neck 134 of the end-fitting 130 and into the cavity 132 and/or in a position below a floor of the cavity 132. The blind hole 146 of FIG. 5B may have a similar diameter and may have a depth of preferably 3/16 inch up to 3/8 inch. It may be desirable to have the holes equally spaced in the horizontal and vertical planes of the end-fitting 130. While any number of holes may be used, it may be preferable for the minimum number of blind holes 146 to be preferably three, but a greater number can be utilized to meet the mechanical requirements predicated upon the preservation of the mechanical integrity of the end-fitting 130 for the intended application.

Figure 6:
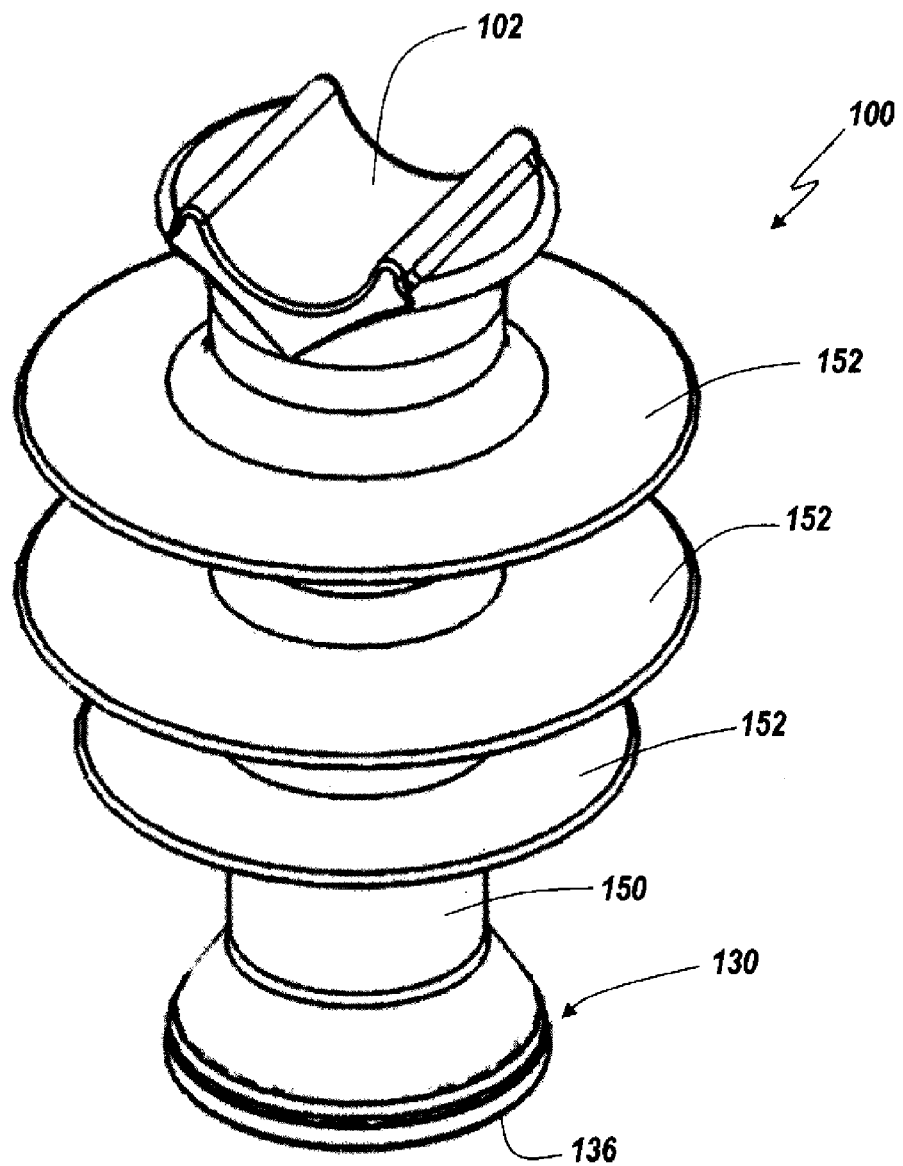
FIG. 6 is a plan view illustration of the electrical insulator apparatus, in accordance with the first exemplary embodiment of the present disclosure.

FIG. 6 is a plan view illustration of the electrical insulator apparatus 100, in accordance with the first exemplary embodiment of the present disclosure. The apparatus 100 is shown in a finished state utilizing one end-fitting 130. As can be seen, the exterior body 150 is molded over the end-fitting 130 leaving only a small base portion 136 of the end-fitting 130 exposed. The exterior body 150 has integrally molded fins 152 rising up the length of the core strength member (not visible) and terminates at a top portion 102 of the apparatus 100, depicted as a curved indentation.

Figure 7:
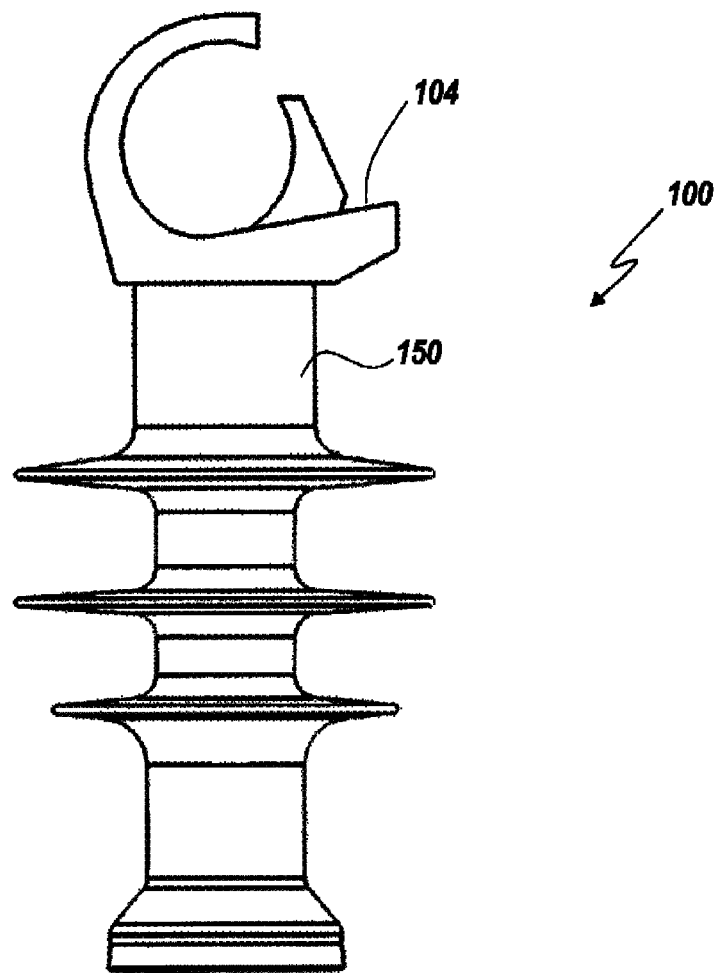
FIG. 7 is a plan view illustration of an electrical insulator apparatus, in accordance with the first exemplary embodiment of the present disclosure.

FIG. 7 is a plan view illustration of an electrical insulator apparatus 100, in accordance with the first exemplary embodiment of the present disclosure. In contrast to FIG. 6, FIG. 7 depicts the apparatus 100 as having a clamp feature at the top portion 104 of the apparatus 100. The clamp feature may be formed through thermoplastic molding of the exterior body 150 or may be a second metal end-fitting 130 without a mechanical compression and without an adhesive between the core strength member (not shown) and the end-fitting 130 under the exterior body 150.

Figure 8:
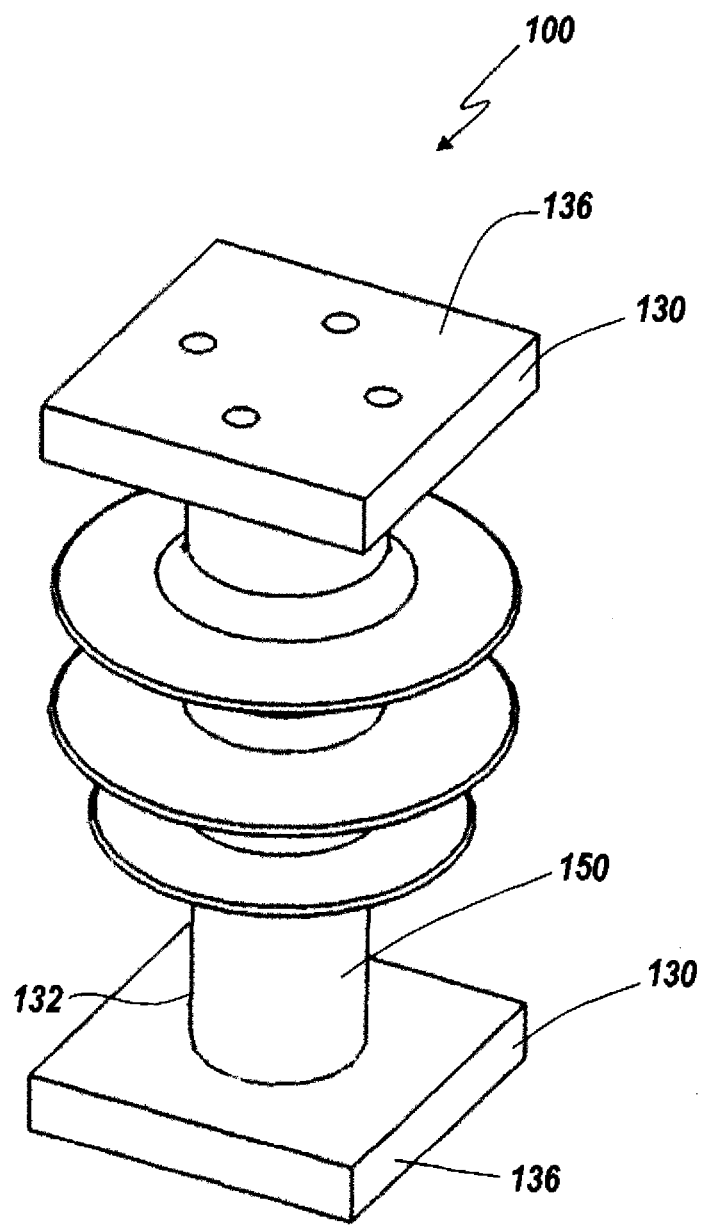
FIG. 8 is a plan view illustration of an electrical insulator apparatus with two end-fittings, in accordance with the first exemplary embodiment of the present disclosure.

FIG. 8 is a plan view illustration of an electrical insulator apparatus 100 with two end-fittings 130, in accordance with the first exemplary embodiment of the present disclosure. Instead of using one end-fitting 130, as shown in FIG. 6, for example, two end-fittings 130 may be used with one core strength member to allow the apparatus 100 to be mechanically engaged from either end thereof. The construction of the apparatus 100 with two end-fittings 130 may be substantially similar to the process described herein relative to an apparatus 100 with one end-fitting 130 with the exception that an end-fitting 130 may be engaged with both ends of the core strength member prior to over-molding the exterior body 150 thereon. As is depicted in FIG. 8, the dual end-fitting 130 design is shown with end-fittings 130 which have an exposed base 136 and a neck 134 being covered by the thermoplastic exterior body 150.

FIG. 9 is a flowchart illustrating a method of manufacturing an electrical insulator apparatus, in accordance with the first exemplary embodiment of the present disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a core strength member is positioned at least partially within at least one end-fitting. A thermoplastic exterior body having a plurality of spaced fins is injection molded over the core strength member and at least partially over the at least one end-fitting, whereby the core strength member is attached to the at least one end-fitting without a mechanical compression to the at least one end-fitting and without an adhesive between the core strength member and the at least one end-fitting (block 204). The method may include additional steps, processes, and functions, including any disclosed with respect to any other portion of this disclosure. For example, the injection molded thermoplastic exterior body having the plurality of spaced fins may be formed by injection molding a thermoplastic olefin polymer material over the core strength member and at least partially over the at least one end-fitting. The injection molding process may use the thermoplastic material in a heated state, where after injection, the injection molded thermoplastic material is cooled, thereby shrinking the injection molded thermoplastic exterior body having the plurality of spaced fins over the core strength member and at least partially over the at least one end-fitting. The resultant structure may permanently attach the core strength member to the least one end-fitting with the injection molded thermoplastic exterior body.

After formation, the exterior body may have a resulting wall thickness of substantially between 0.1 inch and 1.0 inch. The at least one end-fitting may have at least one circumferential boss, whereby the at least one circumferential boss substantially prevents or inhibits vertical movement of the exterior body relative to the at least one end-fitting. The at least one end-fitting may have at least one vertical boss, wherein the at least one vertical boss is positioned between a horizontal base structure and a neck of the at least one end-fitting, whereby the at least one vertical boss substantially prevents or inhibits rotational movement of the exterior body relative to the at least one end-fitting. The at least one vertical boss may include a plurality of vertical bosses spaced equidistantly on the at least one end-fitting. The at least one end-fitting may have at least one blind hole positioned within a neck of the at least one end-fitting, whereby the at least one blind hole substantially prevents or inhibits vertical and rotational movement of the exterior body relative to the at least one end-fitting. The at least one end-fitting may have at least one through-hole positioned through a neck of the at least one end-fitting, whereby the at least one through-hole substantially prevents or inhibits vertical and rotational movement of the exterior body relative to the at least one end-fitting.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of manufacturing an electrical insulator apparatus, the method comprising:
   positioning a core strength member at least partially within at least one end-fitting; and
   injection molding a thermoplastic exterior body having a plurality of spaced fins over the core strength member and at least partially over the at least one end-fitting, whereby the core strength member is attached to the at least one end-fitting without a mechanical compression to the at least one end-fitting and without an adhesive between the core strength member and the at least one end-fitting.

2. The method of claim 1, wherein the exterior body having the plurality of spaced fins is formed by injection molding a thermoplastic olefin polymer material over the core strength member and at least partially over the at least one end-fitting.

3. The method of claim 1, wherein forming the exterior body having the plurality of spaced fins over the core strength member and at least partially over the at least one end-fitting further comprises:
   injection molding the thermoplastic exterior body in a heated state; and
   cooling the injection molded thermoplastic exterior body, thereby shrinking the injection molded thermoplastic exterior body having the plurality of spaced fins over the core strength member and at least partially over the at least one end-fitting.

4. The method of claim 1, wherein the core strength member is permanently attached to the at least one end-fitting without a mechanical compression to the at least one end-fitting and without an adhesive between the core strength member and the at least one end-fitting.

5. The method of claim 1, wherein the exterior body has a wall thickness substantially between 0.1 inch and 1.0 inch.

6. The method of claim 1, wherein the at least one end-fitting has at least one circumferential mechanical upset structure, whereby the at least one circumferential mechanical upset structure substantially prevents vertical movement of the injection molded thermoplastic exterior body relative to the at least one end-fitting.

7. The method of claim 1, wherein the at least one end-fitting has at least one vertical mechanical upset structure, wherein the at least one vertical mechanical upset structure is positioned between a horizontal base structure and a neck of the at least one end-fitting, whereby the at least one vertical mechanical upset structure substantially prevents rotational movement of the injection molded thermoplastic exterior body relative to the at least one end-fitting.

8. The method of claim 7, wherein the at least one vertical mechanical upset structure further comprises a plurality of vertical bosses spaced equidistantly on the at least one end-fitting.

9. The method of claim 1, wherein the at least one end-fitting has at least one mechanical upset structure comprising at least one blind hole positioned within a neck of the at least one end-fitting, whereby the at least one blind hole substantially prevents vertical and rotational movement of the injection molded thermoplastic exterior body relative to the at least one end-fitting.

10. The method of claim 1, wherein the at least one end-fitting has at least one mechanical upset structure comprising at least one through-hole positioned through a neck of the at least one end-fitting, whereby the at least one through-hole substantially prevents vertical and rotational movement of the injection molded thermoplastic exterior body relative to the at least one end-fitting.

11. An electrical insulator apparatus comprising:
    a core strength member;
    at least one end-fitting, wherein the core strength member is positioned at least partially within the at least one end-fitting; and
    an injection molded thermoplastic exterior body having a plurality of spaced fins, the injection molded thermoplastic exterior body formed over the core strength member and at least partially over the at least one end-fitting, wherein the core strength member is attached to the at least one end-fitting without a mechanical compression to the at least one end-fitting and without an adhesive between the core strength member and the at least one end-fitting.

12. The electrical insulator apparatus of claim 11, wherein the injection molded thermoplastic exterior body having the plurality of spaced fins further comprises an injection-molded thermoplastic olefin polymer material molded over the core strength member and at least partially over the at least one end-fitting.

13. The electrical insulator apparatus of claim 11, wherein the injection molded thermoplastic exterior body applies a permanent radial compression force to the core strength member and the at least one end-fitting due to a shrinkage of the injection molded thermoplastic exterior body during a cooling process.

14. The electrical insulator apparatus of claim 11, wherein the injection molded thermoplastic exterior body thickness has a wall thickness substantially between 0.1 inch and 1.0 inch.

15. The electrical insulator apparatus of claim 11, wherein the at least one end-fitting has at least one circumferential mechanical upset structure, wherein the at least one circumferential mechanical upset structure substantially prevents vertical movement of the injection molded thermoplastic exterior body relative to the at least one end-fitting.

16. The electrical insulator apparatus of claim 11, wherein the at least one end-fitting has at least one vertical mechanical upset structure, wherein the at least one vertical mechanical upset structure is positioned between a horizontal base structure and a neck of the at least one end-fitting, wherein the at least one vertical mechanical upset structure substantially prevents rotational movement of the injection molded thermoplastic exterior body relative to the at least one end-fitting.

17. The electrical insulator apparatus of claim 16, wherein the at least one vertical mechanical upset structure further comprises a plurality of vertical mechanical upset structures spaced equidistantly on the at least one end-fitting.

18. The electrical insulator apparatus of claim 11, wherein the at least one end-fitting has at least one mechanical upset structure comprising at least one blind hole positioned within a neck of the at least one end-fitting, wherein the at least one blind hole substantially prevents vertical and rotational movement of the injection molded thermoplastic exterior body relative to the at least one end-fitting.

19. The electrical insulator apparatus of claim 11, wherein the at least one end-fitting has at least one mechanical upset structure comprising at least one through-hole positioned through a neck of the at least one end-fitting, wherein the at least one through-hole substantially prevents vertical and rotational movement of the injection molded thermoplastic exterior body relative to the at least one end-fitting.

20. An electrical insulator apparatus comprising:

a fiberglass core strength member;

at least one metal end-fitting, wherein the fiberglass core strength member is positioned at least partially within a cavity of the at least one metal end-fitting, wherein the at least one metal end-fitting further comprises at least one vertical mechanical upset structure and at least one rotational mechanical upset structure; and an injection molded thermoplastic exterior body having a plurality of spaced fins, the injection molded thermoplastic exterior body molded over the core strength member and at least partially over the at least one metal end-fitting, wherein the core strength member is attached to the at least one metal end-fitting without a mechanical compression to the at least one metal end-fitting and without an adhesive between the core strength member and the at least one metal end-fitting, and wherein the at least one vertical mechanical upset structure and the at least one rotational mechanical upset structure substantially inhibits a vertical and a rotational movement of the injection molded thermoplastic exterior body relative to the at least one metal end-fitting.

\* \* \* \* \*